No. 660,288. Patented Oct. 23, 1900.
P. BROADBOOKS.
PRUNING SHEARS.
(Application filed Sept. 19, 1899.)
(No Model.)
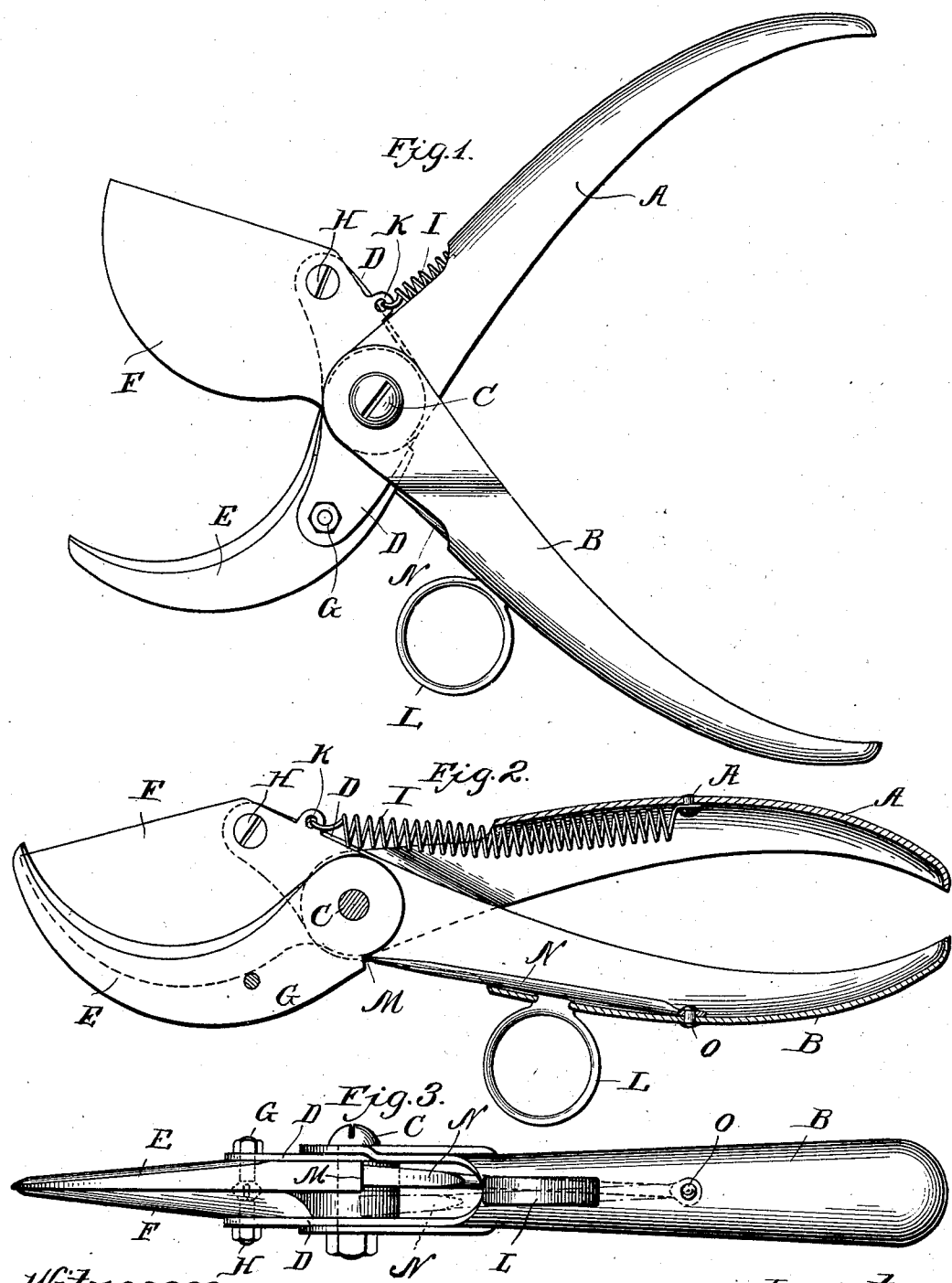
Witnesses
E. C. Wundeman
S. Williamson
Inventor
Peter Broadbooks
by Geo. C. Hazelton Jr.
Atty

UNITED STATES PATENT OFFICE.

PETER BROADBOOKS, OF BATAVIA, NEW YORK, ASSIGNOR OF ONE-HALF TO JOHN H. WARD, OF SAME PLACE.

PRUNING-SHEARS.

SPECIFICATION forming part of Letters Patent No. 660,288, dated October 23, 1900.

Application filed September 19, 1899. Serial No. 731,004. (No model.)

*To all whom it may concern:*

Be it known that I, PETER BROADBOOKS, a citizen of the United States, residing at Batavia, in the county of Genesee and State of New York, have invented a certain new and useful Improvement in Pruning-Shears, of which the following is a specification.

My invention relates to a new and useful improvement in pruning-shears and the like, and has for one object to provide an exceedingly simple and effective device of this description which shall be strong and durable, the cutter-blade and hook being made separate from the handles and of different-grade metal; and a further object of my invention is to so arrange the spring utilized for opening the shears as to give it a long elastic movement, thus preventing it from setting; and a still further object of my invention is to provide a locking-pawl which when carried into engagement with a notch formed in the back of the hook will hold the shears closed, but when out of engagement with this notch will in no wise interfere with the operation of the shears.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1 is a side elevation of a pair of shears made in accordance with my improvement, the same being opened; Fig. 2, a section of the shears in their closed position; Fig. 3, a bottom edge view.

In carrying out my invention as here embodied A and B represent the handles, which are preferably made of soft steel and so shaped as to provide a convenient hold for the hand, and these handles are pivoted together by the screw-bolt C, and each has an extension D for the purpose hereinafter set forth.

E represents the hook, which is also pivoted upon the screw-bolt C and is secured to the lower extension D by the screw-bolt G, thus being made rigid with said extension, so as to move therewith as one piece.

F is the cutter-blade, which is likewise pivoted upon the screw-bolt C and is attached to the upper extension D by the screw-bolt H, causing it to move with the handle B. By this arrangement the cutter-blade and hook may be made of high-grade steel and properly hardened and tempered to produce the most desired results, while at the same time they are backed up by the extensions D, so as to prevent them from springing sidewise when in use, which is usually the most serious defect in pruning-shears, as such side strains are considerable.

By making each handle with one extension and of the same shape it will be seen that they may be manufactured by a single die, and the reversing thereof will cause them to properly come together to form the pivot-joint.

The spring I has its inner end secured at J within the handle A, while its outer end is attached at K to the cutter-blade, by which arrangement the spring lies within the handle and in no wise interferes with the hand of the operator and affords a long elastic movement, which makes the operation of the shears easy.

The ring L projects from the handle B and acts as a guard for one of the fingers, which facilitates the operation of the shears. This ring may be either formed of a separate piece and attached, as shown, or it may be pressed outward from the stock of the handle either in the form here shown or as a hook.

The hook E has a notch M in the back thereof, with which the pawl N is adapted to engage, the latter being pivoted at O, so as to swing sidewise, and when this pawl is swung into engagement with the notch the shears will be held in their closed position, as shown in Figs. 2 and 3; but when the pawl is thrown out of engagement with the notch, as shown in dotted lines in Fig. 3, the shears will be free to be operated in the usual manner, the pawl in no wise interfering with such operation. This is an important feature of my improvement, since by holding the shears in their closed position they may be easily stored or carried in the pocket.

Having thus fully described my invention, what I claim as new and useful is—

1. A pair of pruning-shears consisting of two sheet-metal handles pivoted together each having an extension, a hook, and a cutter-blade pivoted together at the fulcrum of the handles each being attached to one of the extensions, as specified.

2. A pair of pruning-shears consisting of two handles formed of sheet metal each having an extension, said handles being pivoted together by the screw-bolt, a hook and a cutter-blade pivoted upon said screw-bolt and rigidly attached to the extension, and a spring connected with one of the handles and with the cutter-blade, as and for the purpose set forth.

3. In combination, two sheet-metal handles pivoted together by the screw-bolt, an extension formed with each of the handles, a hook rigidly secured to one of the extensions and pivoted upon said screw-bolt, a cutter-blade rigidly secured to the opposite extension and pivoted upon said screw-bolt, a spring one end of which is attached to the cutter-blade, the other being attached to one of the handles, and a pawl pivoted to the opposite handle and adapted to enter into engagement with the notch formed upon the rear of the hook whereby the shears may be held closed, as specified.

4. In combination, two sheet-metal handles pivoted together, an extension formed with each handle, a hook having a notch in the back thereof rigidly secured to one of the extensions, a cutter-blade rigidly secured to the opposite extension, and a transversely-swinging pawl pivoted to one of the handles and adapted to enter into engagement with the notch formed upon the hook, as and for the purpose set forth.

In testimony whereof I have hereunto affixed my signature in the presence of two subscribing witnesses.

PETER BROADBOOKS.

Witnesses:
CARLOS A. HULL,
G. H. HOLDEN.